United States Patent

[11] 3,587,405

| [72] | Inventor | Lloyd H. Holmes<br>Arlington, Tex. |
|---|---|---|
| [21] | Appl. No. | 779,810 |
| [22] | Filed | Nov. 29, 1968 |
| [45] | Patented | June 28, 1971 |
| [73] | Assignee | LTV Electrosystems, Inc.<br>Greenville, Tex. |

[54] INDICATING AND SEAL ACTIVATING DEVICE AND METHOD
5 Claims, 4 Drawing Figs.

[52] U.S. Cl. ........................................... 92/5, 92/82,
92/86, 116/70(D.O.), 277/2, 277/70
[51] Int. Cl. ............................................ F01b 25/26
[50] Field of Search ........................................ 92/5, 82,
86, 84, 111, 112, 160; 277/2, 57 (Inquired), 70, 70
(SP)71 (R), (Inquired); 73/47, 46, (Inquired);
116/70, (Inquired); 184/18, 6 (D), 6 (S)

[56] References Cited
UNITED STATES PATENTS

| 1,022,865 | 4/1912 | Nicolai | 277/2 |
|---|---|---|---|
| 2,230,501 | 2/1941 | MacArthur | 277/59X |
| 2,493,152 | 1/1950 | Malcolm | 277/2X |
| 2,653,065 | 9/1953 | Appleton | 92/160X |
| 2,748,718 | 6/1956 | MacChatchie | 92/160X |
| 3,003,471 | 10/1961 | Bodem et al. | 92/86X |
| 3,119,367 | 1/1964 | Barnes, Jr. et al. | 116/70 |
| 3,181,873 | 5/1965 | Reed | 277/59X |
| 3,216,571 | 11/1965 | Whiting et al. | 210/90 |
| 3,379,206 | 4/1968 | Whiting | 116/70 |
| 3,388,682 | 6/1968 | Whiting | 116/70 |
| 2,908,515 | 10/1959 | Schellens | 277/70X |

*Primary Examiner* — Martin P. Schwadron
*Assistant Examiner* — Leslie J. Payne
*Attorney* — James D. Willborn

ABSTRACT: A device and method useful in conjunction with a hydraulic actuator for providing a signal to indicate that a seal of the actuator has leaked fluid at an excessive rate and for functionally replacing such seal with a secondary seal, which secondary seal is maintained substantially inactive in the fluid circuit until fluid leakage past the primary seal exceeds a predetermined amount.

PATENTED JUN28 1971

LLOYD H. HOLMES
INVENTOR

BY *H.C. Goldwire*
ATTORNEY

INDICATING AND SEAL ACTIVATING DEVICE AND METHOD

This invention relates to a hydraulic device and method for use with hydraulic actuators and more particularly to a device and method for indicating the failure of a seal in a hydraulic actuator and for functionally replacing the seal with a secondary seal.

Modern aircraft and other mechanisms utilize a variety of high-pressure hydraulic actuators, especially for the positioning of control surfaces, landing gear, etc. These actuators normally comprise a housing having a bore and an end wall located between the bore and the control surface or other item to be moved. A typical actuator has a piston mounted in the bore and at least one piston rod attached to the piston and extending through the end wall for attachment to the control surface. The actuator is either single- or double-acting and, in either case, operates upon the application across the piston, of a pressure differential which causes the piston rod to move either outwardly through or to retract inwardly of the end wall. The invention disclosed herein applied equally well to single- or double-action devices.

A major problem associated with actuators of the type described relates to leakage of fluid between the wall of a bore of the actuator and a member of the actuator which is slidably translatable relative to the bore wall. Such a bore may be that in which the actuator piston is slidably mounted, whereupon any leakage is from one side to the other of the piston. To provide another example, the bore concerned may be that which is located in an end cap of the actuator and through which slidingly moves a piston rod of the actuator, leakage then being from the piston bore and toward the atmosphere and occurring between the piston rod and the wall of the end cap bore. Attention hereinafter will be directed to this site of leakage, to provide a ready example, except where expressly noted to the contrary.

A standard method for combating such leakage is to locate a plurality of spaced seals in the bore and in sliding contact with the piston rod. Each seal normally is annular in form and provides a sealing contact, around the perimeter of piston rod, between the piston rod and the wall of the bore. The seal located in the bore and nearest to the piston or source of fluid pressure is normally referred to as the primary seal, and as high pressure is applied to this seal, during operation of the actuator, leakage past the seal often results. Hydraulic fluid is supplied to an actuator from a reservoir through a pump which in turn may supply fluid to other actuators or hydraulic apparatus. It is obvious that as sufficient fluid is lost through leakage, the actuator is disabled an other important hydraulic apparatus may be disabled as well. Thus, to conserve hydraulic fluid, it is standard practice to provide a second hydraulic fluid seal downstream of the primary seal and similarly positioned with respect to, for example, the piston rod and end wall. Additionally, a conduit is provided which connects the bore, at a point between the primary and secondary seals, to the hydraulic fluid reservoir. Fluid leaking past the primary seal is retained by the backup or secondary seal, circulates through the conduit to the reservoir, and is thereby conserved. The primary seal is subjected to high pressure each time the actuator is operated; thus, it is subjected to a high degree of wear. The secondary seal, on the other hand, does not bear the same, high pressure when the primary seal is functioning properly; thus, its wear is substantially less than that of the primary seal. Understandably, as the primary seal begins to wear and to allow greater leakage, pressure on the backup seal increases until it, too, begins to wear and to leak; and the dangers associated with the loss of hydraulic fluid are substantially increased. For this reason, the seals must be constantly inspected and repaired. Machines such as aircraft are ordinarily scheduled for periodic downtime, at which time required inspections, repairs, and maintenance are to be performed; however, in order to maintain an adequate safety margin, an aircraft in which a faulty seal has been located is taken out of service and the repair is made as soon as possible, regardless of the occurrence of scheduled downtime. This results in interrupted service which is economically damaging to commercial airlines and may seriously impair military air operations.

Aside from the problems of fluid loss and unscheduled downtime, there is an additional problem and hazard in that primary seals which are leaking excessively may go unnoticed and undetected because of the difficulty involved in checking these seals between scheduled downtime inspections. For instance, one method of locating fluid leakage is to visually examine the aircraft, during preflight inspection, in search of indications of fluid leakage on the aircraft surfaces. Of course, when indications of fluid loss begin to appear on the exterior of the aircraft, both the primary and the secondary seals have deteriorated to a dangerous point. Quite often, however, the piston rod and the actuator end wall are obscured by the structure, and indications of leakage cannot be readily seen; and it is not readily possible to determine leakage of a piston seal. An easily detectable and automatic indication that a primary seal is leaking excessively would offer a substantially increased safety margin and would reduce maintenance time. It may safely be predicted that aircraft of the future will become yet more complex and more expensive to operate, with the result that downtime will be more expensive; further, such aircraft will have increased speed, weight, and size, and the margin of safety with which they can operate thus will be greatly reduced. Accordingly, the already sever problems associated with leakage, safety, and downtime will be enchanced, and it becomes increasingly important to have a satisfactory resolution readily available. Needless to say, other vehicles and equipment having hydraulic actuators s are subject to the same problems, any difference being in degree of criticality, and an invention which solves aircraft actuator problems is useful to resolve similar problems in these related applications.

Wear associated with a secondary or backup seal is also important, since the secondary seal in may cases is subject to wear at a rate almost as high as that of the primary seal; thus, the effectiveness of a secondary seal to maintain a satisfactory safety and reliability margin is substantially reduced. For instance, leakage past a primary seal serves to lubricate the actuator piston rod and the seal as the piston rod longitudinally longitudinally along it axis in a direction from the primary seal toward the secondary seal. This lubrication serves to reduce friction between the seal and the rod; however, as the rod moves in the opposite direction, the rod tends to be dry, and the friction between the rod and the seal is substantially increased, thereby proportionally increasing the wear to which the seal is subjected. A device for lubricating the rod as it moves in either direction across the secondary seal would serve to substantially increase the reliability of the secondary seal, prolong its usefulness, and decrease the likelihood of loss of excess hydraulic fluid from the actuator.

It is, accordingly, an object of this invention to provide apparatus for automatically causing a backup seal to functionally replace a primary seal upon the occurrence of an excessive rate of fluid leakage past the primary seal.

Another object is to provide an indication that an actuator primary seal has leaked fluid at an excessive rate.

A further object is to provide a device which enables a hydraulic actuator of a mechanism to operate safely and effectively until the next regularly schedules maintenance period of the mechanism, even though an actuator primary seal is leaking fluid at an excessive rate.

An additional object is to provide apparatus enabling the discovery of primary seals which are leaking fluid at an excessive rate.

Yet another object is to provide, for hydraulic actuators, sealing means of improved safety and reliability of operation.

A still further object is to provide a backup seal for a primary seal, which backup seal is maintained relatively inactive compared to the primary seal until the primary seal begins to leak fluid toward the backup seal at an excessive rate.

Other objects and advantages will be apparent from the specification and claims and from the accompanying drawing illustrative of the invention.

Figure 1:
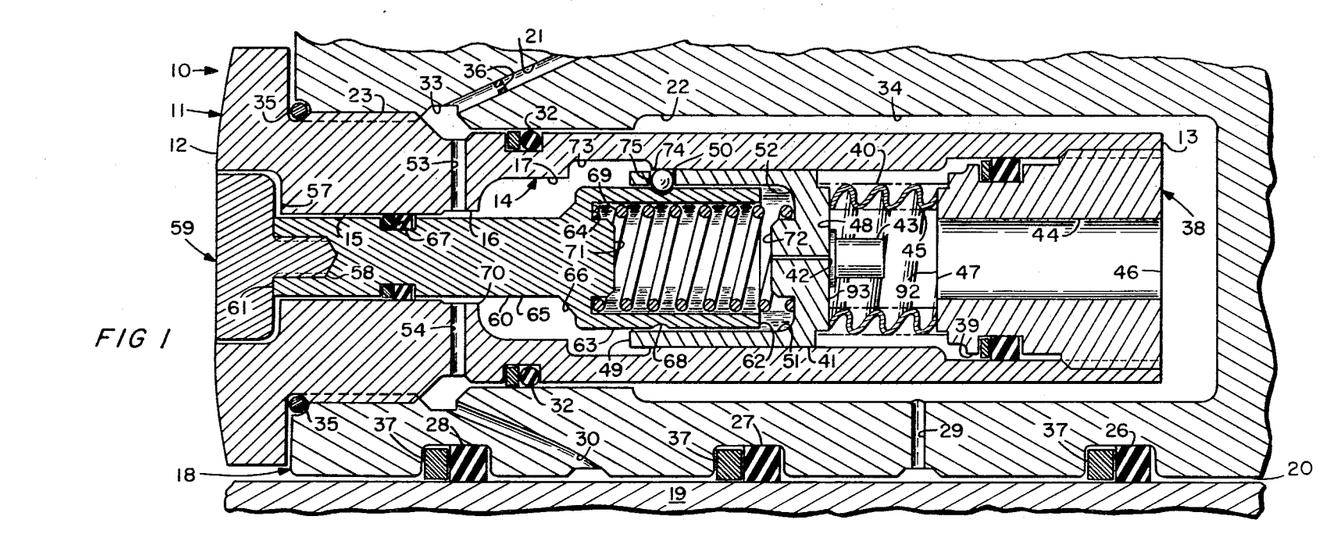
FIG. 1 is a cross-sectional view of the components of an embodiment of the invention with the parts thereof shown in their position occupied prior to excessive leakage of the primary seal.

With reference to FIG. 1, the failure-indicating and secondary seal-activating device 10 comprises a housing 11 having a longitudinal axis, a first end 12, a second end 13, and a walled passageway 14 extending through the housing and along the longitudinal axis to form a cavity having a first portion 15 located adjacent the first end 12, a third portion 17 located adjacent the second end 13, and a second portion 16 located between the first and third portions. Each portion of the passageway 14 has a substantially circular cross section, and a major portion of the wall of the passageway located within each respective portion is parallel to the longitudinal axis of the housing 11. The cross-sectional area of the passageway 14 at any point within the third portion 17 is larger than the cross-sectional area of the passageway at any point within the second portion 16, and the wall of the passageway converges substantially perpendicularly from the third portion to the second portion to form a circular valve seat 70 defined by a sharp, annular shoulder in the wall at the junction of the two passageway portions. FIG. 1 illustrates only so much of a double-acting hydraulic actuator as is required to show one possible connection and operational relationship of the device 10 to the actuator; thus, fragmentary portions of an actuator housing end wall 18, a piston rod 19, and an end wall bore 20 are illustrated. The device 10 is shown positioned with respect to the end wall bore 20, which bore has slidably mounted therein a piston rod 19 that extends through the end wall 18. A second bore 22 is provided in the endwall 18, which second bore is located adjacent the bore 20 and the piston rod 19. The device 10 is mounted in the second bore 22, and connections such as passageways 29, 30 are made from the device and the second bore to the bore 20 through the end wall 18; however, the device can be located at a remote site and the required connections to the bore 20 made through tubing, high-pressure flex hose, or other, similar apparatus. The device housing 11 is provided with an exteriorly threaded portion 23 which mates with a corresponding threaded portion of the second bore 22 to position and hold the housing 11 in the second bore 22 with the second end 13 positioned inside the second bore and with the first end 12 positioned adjacent the outer surface of the end wall 18.

Hydraulic pressure appears in the bore 20 from a conventional actuator piston-cylinder arrangement (not shown) which is located beyond that portion of the end wall 18 which is adjacent the housing second end 13. The end wall 18 closes the actuator cylinder and the piston rod 19, extending through the end wall, is attached to a piston slidably mounted in the cylinder. A primary seal 26, a secondary seal 27, and a return or tertiary seal 28 in the bore 20 are located between the bore wall and the piston rod 19 and in sliding contact with the piston rod 19; further, the seals are mutually spaced longitudinally of the piston rod and the primary seal is located closest to the piston bore (not shown) of the actuator. The primary seal 26 is the first seal contacted by high-pressure fluid introduced into the bore 20 from the piston bore, the secondary seal 27 is spaced from the primary seal and is located immediately downstream thereof, and the return seal 28 is spaced from the secondary seal and is located on the opposite side of the secondary seal from the primary seal. Reinforcing rings 37, preferably made of Teflon or a similar material, are located downstream of and adjacent each respective O-ring seal 26, 27, 28 and serve to prevent the extrusion of a respective seal into the bore 20 by forces imposed by fluid pressures. A first passageway 29 in the end wall 18 communicates with the first bore 20 at a location between the primary and secondary seals and with the second bore 22 at a location in the second bore spaced from the outer surface of the end wall 18. A second passageway 30 similarly connects the first bore 20, from a location between the secondary seal 27 and the return seal 28, to the second bore 22 at a location between the outer surface of the end wall 18 and the point of communication between second bore 22 and passageway 29. The device housing 11 has a circular cross section, as does the portion of the bore 22 located between the first passageway 29 and the second passageway 30; however, the cross section of the bore 22 is generally larger than that of the housing; thus, a space exists between the wall of the bore and the wall of the housing 11. An annular seal 32 is located in the space so defined, at a location between the first passageway 29 and the second passageway 30, to divide the second bore 22 into separate portions 33, 34, respectively, and to prevent the flow of fluid, through the second bore, from one portion to the other. The first portion 33 is located adjacent the outer surface of end wall 18 and is additionally sealed, opposite the annular seal 32, by mating threaded portions at 23 and by a second annular seal 35. Seal 35 is positioned in the second bore 22 in sealing contact with the housing 11 and with end wall 18 to prevent the leakage and loss of hydraulic fluid out of the second bore first portion 33 and toward the outer surface of endwall 18. A return passage 21 extending through end wall 18 communicates with the bore first portion 33 and with a reservoir for hydraulic fluid (not shown). The return connection or passage 21 has located therein, between the bore first portion 33 and the reservoir, a flow-restricting orifice such as 36. Further, the housing 11 has at least one passage, such as 53, which provides communication between the first portion 33 of the second bore 22 and the second portion 16 of the passageway 14 and, in the embodiment illustrated, there is provided a second passage 54 which is substantially a duplicate of passage 53. Expandable member 38 has a longitudinal axis and comprises a base portion 39, an expandable portion or bellows 40, and a movable portion 41, the expandable member extending along the longitudinal axis of the housing 11 and lying within the passageway third portion 17. The base portion 39 has a first end 46 which is secured to the housing second end 13 by mating threads provided on the base portion and in the wall of the passageway 14 and a second end 47 which extends away from the housing second end 13 and into the passageway 14. The base portion first end 46 defines a first end of expandable member 38, which first end is fixed relative to the bore 20 by the mating threads. Further, the base portion 39 has, in communication with the first and second ends 46, 47, an interior passageway 44. The expandable portion or bellows 40 has an interior 45, a first end 92 attached to the base second end 47 such that the base interior passageway 44 is in communication with the bellows interior 45, and a second end 93 which is attached to the movable portion 41 and located in the passageway 14 between the base 39 and the passageway second portion 16. The wall of the bellows 40 acts to bias the bellows second end 93 toward the first end 92; however, the bellows wall is expansible for increasing the spacing between its ends. In other words, the wall of the bellows 40 is contracted in length, as long as the bellows is in a static state, by spring force provided, for example, by the bellows wall itself; thus, the bellows movable end 93 attached to movable portion 41 is biased toward the first, fixed end 92; however, the wall expands in length, in response to any sufficient increase in pressure at the bellows interior 45, to overcome such spring force and increase the spacing between the ends.

The movable portion 41, connected to the bellows 40, has a first end 48 which is attached to the bellows second end 93 to close that end of the bellows interior 45. The movable portion 41 has a circular cross section and is slidably mounted in the passageway third portion 17 such that its second end 49 is spaced from the base portion first end 46; and the second end 49 is movable through a predetermined distance and relative to the bore 20. The movable portion second, distal end 49 is also the second end of expandable member 38 and defines the open end of a cup-shaped retainer further defined by wall 51 and bottom surface 52. The opening defined by end 49 is preferably a circular opening and is located opposite the bottom surface 52 and the bellows 40. A flow-restricting orifice 42 provides communication between the bellows second end 93 and the bottom surface 52 and hence between the bellows interior 45 and, through the cup-shaped retainer, to the passageway third portion 17. The orifice 42 is sized to restrict the flow of fluid through the expandable member 38 when the flow rate exceeds a predetermined amount necessary for filling the orifice cross section. A filter 43 is connected to the movable portion first end 48 and is positioned over the entrance to the orifice 42 such that fluid flowing from the bellows interior 45 and into the orifice must pass through the filter. Further, the movable portion 41 has located therein and near the end 49 at least one preferably circular hole 50 which extends through the wall 51 in a direction perpendicular to the longitudinal axis of housing 11.

From the foregoing description, it is apparent that a means for passing fluid that has leaked past the primary seal 26 and toward the secondary seal 27, during operation of the actuator, to the return connection 21 is provided by a conduit comprising bore 20, passageway 29, second bore second portion 34, base passageway 44, bellows interior 45, orifice 42, a space between the cup-shaped retainer inner surface 51 and the outer surface 63 of a valve member 60 (to be described), passageway third portion 17, passageway second portion 16, passageways 53 and 54, second bore first portion 33, and return connection 21. This conduit serves to bleed away fluid leaking past the primary seal 26 and located in the bore 20 and to circulate this fluid to the return connection 21. Fluid flow through the conduit must, of course, pass through the flow-restricting orifice 42. It is apparent that the valve seat 70 formed in the wall of passageway 14, as previously described, is located in the conduit which passes fluid leaking past the primary seal 26 to the return connection 21 during operation of the actuator; and, if seat 70 is closed, as by a valve member (to be described), fluid flow through the conduit is cut off.

Means responsive to motion of the movable portion 41 through the given distance for terminating the functioning of the means for passing fluid that has leaked past the primary seal 26 and toward the secondary seal 27, during the operation of the actuator, to the return connection 21 comprises a valve member 60, the valve seat 70, the secondary seal 27, and a latching and release mechanism comprising spring 69, an annular groove 68 located on the valve member 60, hole 50 located in the sidewall 51 of the movable portion 41, a ball 75 located in the hole 50, a portion of the wall of the passageway third portion 17, which portion is in sliding contact with the movable portion 41, an offset portion 73 of the passageway of the passageway third portion 17, and a shoulder 74 separating the offset 73 and the passageway wall portion which is in sliding contact with the movable portion 41.

The valve member 60 comprises structure having a longitudinal axis, a surface 65, and a first end 61, which first end is located adjacent the first end 12 of the device housing 11. The valve member 60 is slidably mounted in the passageway first portion 15 with its longitudinal axis substantially in register with, respectively, the longitudinal axes of the housing 11 and of the expandable member 38. Further, the valve member 60 extends through the passageway first and second portions 15, 16 and terminates at the valve member second end 62, which second end lies inside the passageway third portion 17. The second end 62 is cup-shaped and is of a configuration similar to the second end 49 of movable portion 41; however, the diameter of the valve member second end 62 is slightly smaller than the diameter of the movable portion second end 49, and second end 62 is turned in an opposite direction from second end 49 so that the second end 62 fits inside the cup formed by second end 49 and is movable with the valve member 60 and along the valve member longitudinal axis with respect to the second end 49. The second end 62 has outer surface 63 in sliding, but not sealing, contact with wall 51 of movable portion 41. The space between the valve member outer surface 63 and the movable portion wall 51 forms a part of the conduit for passing fluid from the bore 20 to the return connection 21, and it is important that the surface and the wall are not in sealing contact so that fluid appearing inside the cup-shaped second end 49 of movable portion 41 passes through this space to the passageway first portion 15 has a circular cross section that is somewhat smaller than the cross section of the second end 62 and, at a point within the passageway third portion 17, the surface 65 of the valve member 60 diverges at an acute angle with respect to the longitudinal axis of the valve member to join the surface 63 of the second end 62 to form a conically shaped, annular valve portion 66 for mating with and closing the valve seat 70. The valve member second end 62 has located thereon, on the surface 63, an annular groove 68, which groove has a rounded bottom surface and encircles the valve member. Additionally, annular seal 67 is located in the space between valve member surface 65 and the wall of the passageway first portion 15 to prevent fluid leakage through the first portion and out of the passageway 14. A resilient member or spring 69 having first and second ends is located between the movable portion 41 and the valve member second end 62. The diameter of the spring 69 is such that its first end fits inside the cup formed by the valve member second end 62 and against the bottom surface 64. Bottom surface 64 has a protrusion 71 which has a circular cross section having a diameter slightly smaller than the inside diameter of the spring 69, thus the spring fits over the protrusion 71 and is thereby positioned centrally of the housing 11. The second end of spring 69 seats, in a like manner, against the bottom 52 of the cup formed by the second end 49 of the movable portion 41 and is similarly held in position by a protrusion 72. An indicator button 59 having a circular cross section is fastened to the first end 61 of the valve member 60, as by the screw and threaded bore arrangement 58. The housing first end 12 has a recessed portion 57 having a circular cross section similar to that of the indicating button 59, but with a larger diameter, so that the indicating button fits into the recess with the outer surface of the button flush with the outer surface of the housing 11 when the valve member 60 is fully retracted into the housing.

Figure 2:
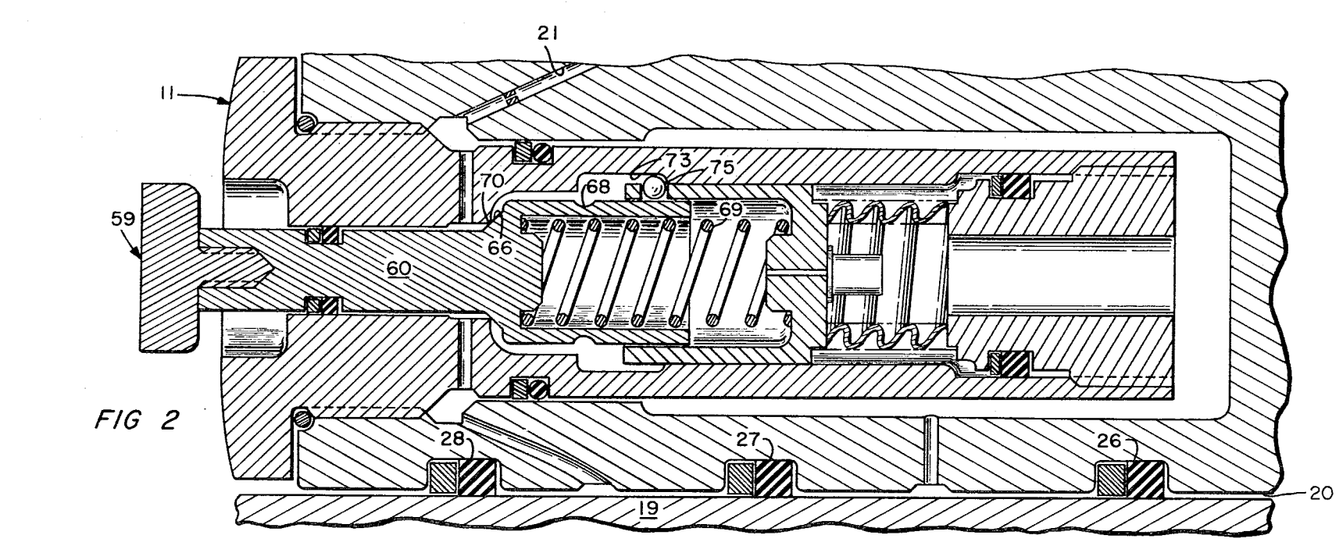
FIG. 2 is a fragmentary, cross-sectional view similar to FIG. 1, only so much of the device being shown as is required to show parts which have moved.

Means for holding the valve member 60 fixed relative to the expandable member 38 and in a spaced relation to the valve seat 70 until the movable portion 41 has moved through a given distance comprises the hole 50 in the movable portion 41, the annular groove 68 in the valve member 60, a ball 75 located in the hole 50, and an annular offset 73 in the wall of the passageway third portion 17. The cross section of the offset 73 is larger than the cross section of the remainder of passageway 14. The wall of passageway 14 located inside the offset 73 is substantially parallel to the longitudinal axis of the housing, as is the wall of the passageway adjacent and in sliding contact with the movable portion 41; however, the wall converges substantially perpendicularly from the offset wall to the passageway wall to form a well-defined shoulder 74 at the junction. The shoulder 74 is spaced from the housing second end 13 by a fixed, predetermined distance; and when the bellows 40 is in a static, nonexpanded state, the edge of the hole 50, which edge lies furthest from the housing second end 13, is in register with the shoulder; further, when the valve member 60 is forced into the housing 11 such that the outer surface of the indicating button is in register with the outer surface of the housing 11, the spring 69 is compressed between the valve member and the expandable member 38, and the annular groove 68 extends beyond the shoulder in the direction of the housing second end 13 and into register with the hole 50. The ball 75, preferably made of steel, is located in the hole 50, and as the hole and groove 68 come into alignment under the portion of the passageway wall which is in sliding contact with the movable portion 41, the ball seats in the groove and is held in that position by the wall; thus, the valve member 60 is held in a fixed position relative to the movable portion 41. The offset 73 and the spring 69 provide a means for releasing the valve member 60 from the movable portion 41, as shown in FIG. 2. The spacing between the wall of the offset 73 and the movable portion 41 is greater than the spacing between the wall of the passageway 14 in sliding contact with the movable portion such that when the movable portion has moved toward the valve seat 70 (and offset 73) through a given distance to place the ball 75, the groove 68, and the hole 50 beyond the shoulder 74 and into the offset portion 73 of the passageway, the ball has room to move outwardly from the groove into the offset, clear the groove, and release the valve member 60 from the movable portion 41, thus leaving each free to move with respect to the other. The compressed spring 69 acts to bias the valve member 60 apart from the movable portion 41; thus, the annular groove 68 tends to move across the hole 50 at all times such that the wall of the groove, because it is inclined with respect to the longitudinal axis of the device 10, exerts forces on the ball 75, which forces tend to move the ball outwardly from the groove and to move it laterally along the direction of motion of the valve member 60. So long as outward motion of the ball 75 outwardly from the groove and to move it laterally along the direction of motion of the valve member 60. So long as outward motion of the ball 75 is restrained by the wall of the passageway and lateral motion is restrained by the wall of the hole 50, the ball remains stationary and the valve member 60 and the movable portion 41 are held fixed with respect to one another, because the forces exerted on the ball and on the wall of the groove are equal and opposite; however, as the ball is relocated into the offset 73, the outward motion of the ball is no longer restrained, the force of the wall of the groove directed outwardly from the groove acts on the ball to move it outwardly from the valve member and into the space provided by the offset, and the valve member is released from the movable portion.

The valve member 60, the spring 69, and the valve seat 70 provide a means for halting the bleeding of fluid flow past the primary seal 26 and toward the secondary seal 27 from the bore 20 and for passing the fluid to the return connection 21. Refer to FIG. 2. When the valve member 60 is no longer fixed to the movable portion 41, as when the ball 75 moves outwardly from the groove 68 and into the offset 73, means biasing the valve member away from the movable portion and operative for forcing the valve member into engagement with the valve seat 70 upon the movable portion 41 having moved through a given distance operates to close the conduit passing fluid leaking past the primary seal 26 to the return connection 21. This last-named means, in the preferred embodiment, comprises the spring 69. When the valve member 60 is released from the movable member 41, the spring 69 extends to its free length to force the valve member 60 and the movable portion 41 apart; consequently, the conically shaped valve portion 66 is forced into the valve seat 70 and seals the passageway second portion 16 from the third portion 17 to stop the flow of fluid in the conduit between the bore 20 and the return connection 21. Signaling means responsive to operation of the device for halting bleeding of fluid in the bore 20 past the primary seal 26 and for providing an indication that excess leakage of fluid past the primary seal has occurred comprises an indicating button 59 attached to the first end 61 of the valve member 60, as by threaded connection 58. As the valve member 60 is forced into the valve seat 70, the indicating button 59 is extended outwardly from its position in the housing recess 57 to signal that excess leakage of fluid past the primary seal has occurred and has reached or exceeded a predetermined magnitude.

When the valve member 60 is spaced from the valve seat 70 (FIG. 1), the secondary seal 27 maintains hydraulic pressure at a lower value than the hydraulic pressure on the primary seal 26, during operation of the actuator, because high-pressure fluid leaking past the primary seal is bled away to the return connection 21 through the open conduit; however, when the valve is closed (FIG. 2), the secondary seal 27 is activated in that the high-pressure fluid leaking past the primary seal 26 is no longer passed to the return connection 21, and the secondary seal must then bear the same hydraulic pressure that, in operation of the actuator, is imposed upon the primary seal. Thus, the release mechanism comprising ball 75, hole 50, offset 73, annular groove 68, spring 69, valve member 60, and valve seat 70 constitutes a secondary seal activator which acts in response to the expansion of expansible member 38. Once activated, the secondary seal 27 may eventually allow some leakage toward the tertiary or return seal 28, and means for passing this fluid from the bore 20 to the reservoir return connection 21 comprises a conduit made up of passageway 30, first portion 33 of second bore 22, and reservoir return connection 21.

Figure 3:
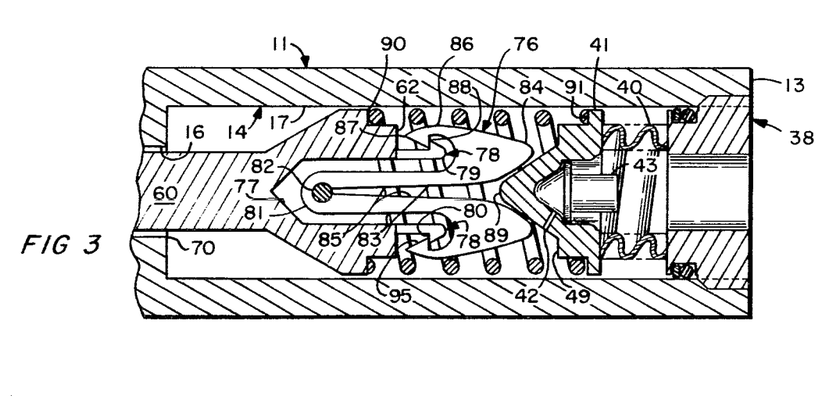
FIG. 3 is a cross-sectional view of an alternate embodiment of the invention.

An alternate embodiment of the invention is illustrated in FIG. 3. The change in configuration is related particularly to the means for holding the valve member 60, which means (in the alternate embodiment) comprises expandable member 38, valve member 60, and a latching and release member 76, which release member is positioned between the valve member and expandable member. The valve member 60 is positioned as in the embodiment illustrated in FIG. 1; the valve member second end 62, however, is configured to provide a slot 77 which extends from the second end 62 into the valve member along its longitudinal axis and which traverses the valve member in a direction perpendicular to the longitudinal axis. Further, the end 62 has opposed, substantially rigid protrusions or parts 78 which extend outwardly from the end toward the expandable member 38 and are characterized by opposed seat portions 79 located at the distal end of each protrusion.

Each protrusion 78 has a flat outer surface which faces away from the longitudinal axis of the valve member 60 and defines a plane which is parallel to a plane which contains a line defining the longitudinal axis of the valve member. Each seat portion 79 is characterized by a first surface, which perpendicularly joins the outer surface of the protrusion 78 to form a latch seat 80 and extends outwardly therefrom, and also by a second surface which joins the perpendicular surface at a point spaced from the seat 80 and extends inwardly therefrom and toward the longitudinal axis of the housing 11 to form an acute angle with the longitudinal axis to join with the distal end of the seat portion 79. The latching and release member 76 has an end 81 and a first pair of resilient arm members 83. The end 81 is fixedly located with respect to the bore 20 and is secured to the housing 11 by a pin 82, which pin traverses the passageway 14 and is perpendicular to and intersects the longitudinal axis of the passageway. The end 81 and pin 82 are located in the passageway third portion 17, and the slot 77 in the valve member 60 is in register with the pin such that the end 81 fits into the slot when the valve member is fully retracted into the housing 11; but the valve member does not usually make contact with the latching and release member 76. The end 81, however, is at all times located in the slot or between the protrusions 78; and should the valve member tend to rotate around its longitudinal axis, a portion of the valve member which defines the slot contacts the latching release member 76, which contact restricts the rotational movement. The arms 83 extend away from the end 81 in the direction of the housing second end 13, and each arm has an end 84 spaced from end 81 and an interior wall 85 which is opposed to the wall 85 of the opposite arm.

The arms 83 are rigidly joined together at the end 81, and the portion of each arm between the end 81 and the end 84 is resilient; thus, the end 84 of each arm 83 is movable with respect to the end 84 of the opposite arm and, as the arms are spread apart from their static position, tension is created in the arms, which tension tends to bias the arms back to their original position.

Along their lengths from the pin 82 to their respective, spaced apart ends 84, the walls 85 of the respective arm members diverge with respect to each other. The walls 85 diverge gradually and at a substantially constant rate away from the longitudinal axis of the latching and release mechanism 76 out to a line, which line is defined by a first plane which is perpendicular to and intersects the longitudinal axis of the mechanism 76 and which first plane is spaced along the longitudinal axis from a second plane, also perpendicular to and intersecting the longitudinal axis, which second plane additionally is in register with and intersects each of the respective ends 84. The spacing between the planes is substantially the same as the spacing between the respective ends 84, the first plane being the nearer to the pin 82. Beyond their line of intersection with the first plane, the walls 85 diverge at an increasingly rapid rate, as compared to the divergence of the walls 85 up to that line; and each wall, from there to its end 84, forms an arcuate contact area and bearing surface for contact with the movable portion second end 49, as described below. The spacing between the distal extremities of the arms at their respective ends 84 is substantially the same as the diameter of the largest circular cross section of a conically shaped protrusion 89 formed on end 49 of the movable portion 40, which protrusion is also described below. Each end 84 is spaced from the movable portion 38 and is contactable thereby during movement of the latter through a given distance.

Each arm 83 has, adjacent its end 84, an appendage 86 and each appendage extends rearwardly, away from the end 84, to a distal end 87. Each appendage 86 is located on the opposite side of the respective arm 83 from the longitudinal axis of the mechanism 76, and the length of the appendage is short with respect to the length of the arm 83; further, in comparison to the flexibility of the arms 83, each appendage 86 is substantially rigid such that its flexibility with respect to the end 84 is negligible. The distal end 87 of each arm 83 is shaped to form a hook 95, which hook is turned in from the respective appendage 86 toward the respective arm member 83. Each hook 95 is characterized by a sharp edge 88 and a first wall extending away from the edge and perpendicularly away from the longitudinal axis of the mechanism 76, which first wall terminates in an inner wall of a respective appendage which has an arcuate cross section and which connects with the outer surface of a respective arm member 83 to form a recess located between a respective hook 95 and an arm member end 84. Each hook 95 is further characterized by a second wall connecting the edge 88 and a respective appendage distal end 87, which second wall is inclined with respect to the longitudinal axis of the mechanism 76. As the valve member 60 is forced into the housing 11, as when the embodiment shown is manually set for operation, the second wall is in register with and contacts the inclined second surface of the valve member seat portion 79. The spacing between the edge 88 of one appendage 86 and the edge 88 of the opposite appendage 86 is substantially the same as the spacing between the seat 80 of one protrusion 78 and the opposing seat of the opposite protrusion on valve member 60; thus, each arm 83 must flex outwardly from the longitudinal axis and from its static position, or movement of the valve portion 60 into the housing 11 is blocked as the inclined surface of a seat portion 79 contacts the inclined surface of a respective hook 95. The contacting surfaces of the hook 95 and the protrusion 78 act, however, since they are inclined in opposite directions with respect to each other, to facilitate the required flexure of the arms 83; and force applied to the valve member 60 to move it into the housing 11 is directed, by the inclined surfaces, in directions in which it tends to displace the protrusion 78 inwardly and displace the resilient arm members 83 outwardly with respect to the longitudinal axis, thus allowing the valve member 60 to proceed into the housing 11. As the movement of the value member 60 continues into the housing 11, the protrusion 78 extends into the arcuate recess between the hook 95 and the end 84 of the arm 83; as the end 79 of the protrusion 78 and the appendage 86 overlap sufficiently, the sharp edge 88 moves into the seat 78 and the appendage 86 overlay sufficiently, the sharp edge 88 moves into the seat 80 to hook the valve member 60 to the latching and release mechanism 76, with each respective edge being held firmly in a respective seat by forces in each arm to its static position. The latching means for holding the valve member 60, accordingly, comprises the protrusions 78 and the latching and release mechanism 76. As will be described, the arms 83 and the appendage 86 of the release mechanism 76 are movable with respect to the protrusions 78 for releasing the valve member.

The expandable member 38 is generally configured in the same manner as the expandable member 38 in FIG. 1 except for the second end 49 of the movable portion 41. In the alternate embodiment, the second end 62 (FIG. 3) has a conically shaped protrusion or part 89 extending outwardly from the end 49 along the longitudinal axis of the housing 11 and toward the valve seat 70; thus, when the movable portion 38 is in its static position or has moved through a given distance, the conically shaped protrusion 89 contacts the latching and release mechanism walls 85 at a location between the ends 84 and forces the arm members 83 apart to unseat the sharp edge 88 from the seat 80, thereby rending the valve member 60 movable relative to the valve seat 70. An orifice 42, similar to orifice 42 of FIG. 1, is located in the movable portion 38 in communication with the interior of the bellows 40 and with the passageway third portion 17.

A resilient member or coiled spring 69, again similar to the spring of FIG. 1, is located between the valve member 60 and the movable portion 41 to bias the members apart when the spring is compressed; however, the spring in this alternate embodiment seats on seat 90 on valve member 60 and on seat 91 on the movable portion 38 and encircles the latching mechanism 76.

With reference to aspects of operation of the device not already described, the component parts of the device 10 (FIG. 1) are positioned for operation in connection with an actuator where the primary seal has not leaked excessively. In this position, the outer surface of the button 59 is flush with the outer surface of the housing 11, the valve portion 66 is spaced from the valve seat 70, and the spring 64 is compressed between the movable portion 41 and valve member 60 to bias the members apart. The bellows 40 is contracted in length and in its static state. The valve portion 66 is set in its open position, in which it is held by the latching mechanism comprising the ball 75, hole 50, annular groove 68, offset 73, shoulder 74, and a portion of the wall of passageway 14 which is in sliding contact with movable portion 41. The diameter of the ball 75 is such that when it is seated in the annular groove 68 and both the ball and the groove are positioned under the portion of the wall of passageway 13 in sliding contact with movable portion 41, the ball is in contact with both the groove and wall and fits tightly therebetween. In this position, the valve member 60 is prevented from moving longitudinally of the housing 11 by the ball 75, which in turn is held in a fixed position relative to the valve seat 70 by the hole 50 in the movable portion 41 as long as there is no expansion of the bellows; thus, the valve member 60 and movable portion 41 are locked together and both must move, in unison, in response to any expansion of the bellows 40. As long as the seal 26 does not leak excessively, the device remains in this condition; however, upon the seal 26 having begun to leak at an excessive rate, the device 10 responds by functionally replacing the primary seal 26 with the secondary seal 27. In the set position defined above, the valve member 60 is fully retracted into the housing 11, such that the outer surface of the indicating button 59 is flush with the outer surface of the housing 11. The indicating button 59 is preferably positioned at a location accessible to a person responsible for checking seals during, for example, aircraft maintenance periods. A visual check which finds the button 59 in this position indicates that, if the primary seal has leaked, the leakage has not exceeded an acceptable amount; but to find the button extended from the housing 11 indicates that the seal 26 has leaked excessively and should be replaced. It is apparent that the apparatus described above for operating in response to the excess leakage and causing the button 59 to extend from the housing could just as easily close a set of electrical contacts to provide an electrical indication, as at a control panel, that the seal 26 has failed; thus, the type of installation utilized depends, among other things, upon the amount of automation required.

The interior of the device 10, the actuator bore 20, the end wall bore 22, and the passageways 21, 29, and 30 are filled with hydraulic fluid which, in the absence of leakage past the primary seal 26 and into the bore 20, remains at substantially the same pressure level as the fluid reservoir (not shown), and movement of fluid through the apparatus described is negligible; as the primary seal 26 is subjected to wear through repeated operation of the actuator, however, the seal begins to deteriorate and leadage past the seal begins to occur. This leadage is usually small at first; but, as wear increases, the leakage from the actuator and past the seal increases accordingly. The reservoir fluid and the fluid in the device, the bore 20, and the connecting passageways is ordinarily maintained as a nominal pressure, for instance 50 p.s.i., which pressure is sufficient only to prevent cavitation in the fluid; the fluid leaking past the primary seal 26 and into the bore 20, however, is high-pressure fluid and there is, accordingly, a pressure-drop across the primary seal 26.

While the primary seal 26 is subjected to relatively heavy wear during operation of the actuator, the secondary seal 27 is (for reasons which follow) subjected to wear at a substantially reduced rate. A large portion of the wear of the primary seal 26 is attributable to the fact that the high pressure exerted on the seal during operation of the actuator causes the seal to deform, with the result that a portion of seal 26 is forced, with intense pressure, onto the moving piston rod 19, thereby substantially increasing the friction between the seal surface in contact with the piston rod and the piston rod and correspondingly increasing the wear. In contrast to the primary seal 26, however, the secondary seal 27 does not experience the high pressure and the resultant deformation and wear because the high pressure of the fluid leaking into the bore 20 is partially lost across seal 26, which retains some effectiveness even after it leaks an excessive amount, and the remainder is bled away through the conduit connecting the bore with the return connection 21; thus, the hydraulic pressure on the secondary seal is maintained at a lower value than is the hydraulic pressure on the primary seal, during operation of the actuator, as long as the conduit to the return connection remains open. The bleeding process takes place when the leakage fluid is transferred through movement of fluid in the conduit, the conduit beginning with passageway 29 and ending with return connection 21. Wear on seal 27 is further reduced by having hydraulic fluid located in the bore 20 on both sides of the seal, as provided by passageways 29 and 30, since fluid on each side of the seal provides lubrication of the seal regardless of the direction of motion of the piston rod 19. Were the seal 26 lubricated on one side only, motion of the piston rod 19 across the seal from the dry side would cause the seal to wear at a faster rate, because the friction between the seal and the rod in that direction would be substantially increased. It is apparent, then, that if this conduit is closed such that the pressure resulting from leakage past the primary seal cannot be bled away to the fluid reservoir, the full pressure appearing in the actuator, less any pressure reduction across the primary seal 26, is applied to the secondary seal 27; hence, in this event, the actuator system remains completely functional and retains a high degree of safety since seal 27, at the time it is pressurized, has not been subjected to the greater degree of wear that seal 26 has experienced and is effectively a new seal placed into the fluid circuit. Additionally, seal 27 is associated with a backup or return seal 28 which effectively replaces secondary seal 27, in its back up capacity, when seal 27 is activated as a primary seal. As high-pressure fluid eventually begins to leak past seal 27, the fluid is transferred to the return connection 21 via a second conduit which comprises passageway 30 and the second bore first portion 33.

The means for sealing the passageway second portion 16 from the passageway third portion 17 serves to halt excessive flow of leaked fluid through the valve seat 70 and to the return connection 21 and comprises the expandable member 38, spring 69, valve member 60, valve seat 70, and a latching and release mechanism comprising annular groove 68, hole 50, ball 75, offset 73, and the passageway wall in sliding contact with the movable portion 41. This means operates in response to an increase above a predetermined level of fluid pressure in the first conduit and specifically to the restriction of fluid flow by the orifice 42 when the rate of fluid flow through the conduit exceeds a predetermined level.

The size of the orifice 42 is such that, until the flow rate of fluid leaked past the primary seal 26 reaches a predetermined level, the bellows 40 remains in its contracted, static state. Upon this predetermined level of flow having been reached, the increased pressure in the bellows 40 accompanying the increased pressure-drop across the orifice 42 causes an expansion of the bellows to move the movable portion 41 and valve member 60 toward the valve seat 70 until the new pressure in the bellows is brought into equilibrium with the spring force of the bellows urging it to return to its contracted state. As leadage past the primary seal 26 continues to increase, the movable member 41 and valve member 60 are thus moved still further toward the valve seat 70 until the ball 75, having thus moved longitudinally through a given distance, passes beyond the shoulder 74 and into register with the off set 73. Therefore, it is apparent that the orifice 42 provides a means for passing fluid flow at a preselected rate through the conduit to the return connection and for impeding fluid flow in excess of the predetermined rate to expand the bellows 40.

The ball 75 thus having been released, the spring 69, which has been compressed between the movable portion 41 and the valve member 60, is released and, as previously described, the inclined wall of the annular groove 68 is driven forward toward the valve seat 70 and in turn drives the ball 75 outwardly from the groove and into the space provided by offset 73. The valve member 60 is thereby released from the movable portion 41, and the valve member is driven forward by the spring 69 to force valve portion 66 into valve seat 70, thereby closing off the passageway 14 so that fluid or fluid pressure can no longer be transferred through the first conduit to the return connection 21. Once the conduit is closed, hydraulic pressures applied to the bore 20, as by leaking past the seal 26, are no longer bled away to the return connection 21 and are confined within the bore, with the result that the full pressure of the fluid passing seal 26 is applied to the seal 27. It is also apparent that, as the valve member 60 is driven into the valve seat 70, the indicating button 59 is moved outwardly from the housing 11 to provide the visual indication previously described.

Except as noted below, the modification shown in FIG. 3 operates in substantially the same manner as the embodiment shown in FIG. 1. The valve member 60 (FIG. 3) is latched to the latching member 76, which latching member is fixedly secured to the housing 11 by the pin 82 at the latching member second end 81. This connection holds the valve member valve portion 66 spaced from the valve seat 70. Where the valve member 60 and the latching mechanism 76 are hooked together in this manner, the spring 69 is compressed between the valve member and the movable portion 41 to bias these members apart. Since the orifice 42 is positioned near the base of the conically shaped protrusions 89, the downstream opening of the orifice is never blocked by the latching member 76. As the bellows 40 expands in response to excess leakage past the primary seal, the conically shaped protrusion 89 moves longitudinally of the housing and toward the latching member 76 and contacts both arms 83 at the rapidly diverging portion of the surface 85 near the respective ends 84. As the bellows 40 expands further, the surface of the conically shaped protrusion 89 slides between the respective walls 85; thus, forces exerted on the walls 85 by the inclined surface of the protrusion 89 drive the latching member ends 84 apart and, in turn, force the respective edges 88 outwardly from the respective seats 80, thus releasing the valve member 60. Once released, the valve member 60 is driven forward by the spring 69 to drive the valve portion 66 into the valve seat 70 and close off the passageway second portion 16 from the third portion 17, thereby closing the conduit that passes fluid through passageway 29 to the return connection 21.

Figure 4:
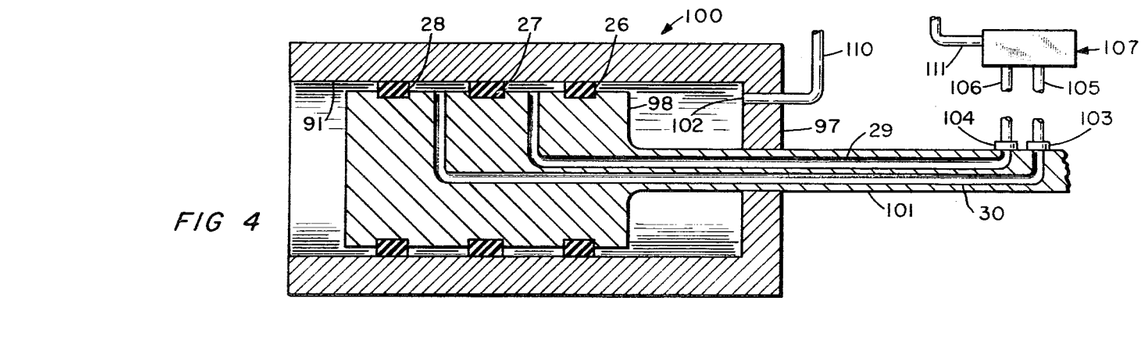
FIG. 4 is a cross-sectional view of a single-acting hydraulic actuator employing a schematically shown modification of the invention.

As previously mentioned, the device 10 is also operative and of advantage where the first, sliding member is a piston 98, rather than a piston rod, and the piston is slidably mounted in the bore 91 (FIG. 4) of a cylinder rather than in an endwall bore. For example, a single-acting actuator 100 has one end open to the atmosphere and has a piston 98 and a piston rod 101 extending through an end wall 97 of the actuator. The piston 98 has a primary seal 26, a secondary seal 27, and a return seal 28 mutually spaced longitudinally of the piston and located between the surface of the piston and the wall of the bore 91. The closed end 97 of the bore 91 has at least one port 102 through which fluid from a line 110 is introduced into the actuator 100 to drive the piston 98. A first passageway 29 communicates with a location between the primary seal 26 and secondary seal 27 and a fitting 104 located on the surface of the piston rod 101 past the end wall from the piston 98. A second passageway 30 communicates with a location between the secondary seal 27 and the return seal 28 and a fitting 103 located adjacent the fitting 104. Fittings 103 and 104 are connected through flexible hoses 105, 106 to a device 107 containing the elements and construction comparable to those shown at 10 in FIG. 1. The hoses 105, 106 thus are extensions of the first and second passageways 29, 30 and empty into first and second portions of a second bore located in the device 107 of FIG. 4 equivalent to the bore portions 33, 34 of FIG. 1. A line 111 extends from the device 107 to a hydraulic reservoir (not shown) and is connected, interiorly of the device 107, to the equivalent of the return passageway 21 (FIG. 1). The device 107 (FIG. 4) is mounted near the actuator on any convenient structure or may be mounted on the piston rod 101 or actuator barrel. Except as noted above, the construction and operation of the modification shown in FIG. 4 is the same as that described in connection with FIGS. 1 and 2.

From the above, it is apparent that the devices of both FIG. 1 and FIG. 3 are efficacious in implementation of a method for minimizing wear on a secondary seal during satisfactory operation of a primary seal in which leakage past the latter is at less than a predetermined rate. When the predetermined rate of leakage is reached, however, the primary seal is functionally replaced by the secondary seal. As described above, the two seals are located between the wall of a bore (the end cap bore 20) and a member (the piston rod 19) slidably mounted in the bore; the primary seal 26 is adjacent a region (the piston bore of a hydraulic actuator) which is subjected to high fluid pressures, while the secondary seal 27 is interposed between the primary seal and the atmosphere.

Providing hydraulic fluid on both sides of the secondary seal 27 during the time that leakage past the primary seal is at less than a predetermined rate is accomplished by connecting the bore 20 with the hydraulic reservoir on the side of the secondary seal nearer the primary seal and also on the opposite side of the secondary seal, i.e. its side nearer the atmosphere. These connections mare made through the first and second passageways 29, 30 and other conduits (including return connection 21) already described.

Bleeding of leakage from the piston bore, past the primary seal 26, and into the portion of the end cap bore lying between the primary and secondary seals 26, 27 is accomplished through the first passageway 29 and other items described. Such bleeding, which is continued during such time that the leakage has not exceeded a predetermined rate, prevents the leakage from imposing high pressures on the secondary seal 27 and thereby is an important factor in minimizing wear on that seal occasioned by sliding of the piston rod 18 through the end cap bore 20.

Blocking off the bleeding is effected, when leadage past the primary seal reaches a predetermined rate regarded as excessive, by the previously described cooperation of the bellows 40, orifice 42, latching means including (for example) ball 75, spring 69, valve portion 66, and valve seat 70. Leakage past the primary seal 26 thereafter builds up the fluid pressure in the space between the primary and secondary seals 26, 27 until the full pressure existing in the piston bore is imposed on the secondary seal 27. Since the second passage 30 remains connected to the return passage 21, and since there is leakage past the primary seal 26, the secondary seal continues to be lubricated on both of its sides.

Providing a signal indicating that leakage past the primary seal 26 has reached the predetermined rate regarded as excessive is accomplished by extension of the indicating button 59 to a position spaced outwardly from the adjoining surface of the housing. Since the button 59 is rigidly connected to and moveable with the valve portion 66, this extension occurs simultaneously with initiation of blocking off the previously permitted bleeding by movement of the valve portion 66 into a position in which it closes off the valve seat 70.

While only one embodiment of the invention, together with modifications thereof, has been described in detail herein and shown in the accompanying drawing, it will be evident that various further modifications are possible in the arrangement and construction of the components and the steps of its method without departing from the scope of the invention.

I claim:

1. In combination with a hydraulic actuator having a bore, a first member slidably mounted in the bore, and a primary, a secondary, and a return seal spaced along the bore in sliding contact with the first member, and a return connection to a reservoir of hydraulic fluid, a failure-indicating and a secondary seal activating device comprising:

- a housing having a longitudinal axis, first and second ends, and a walled passageway extending through the housing along the longitudinal axis to form a cavity and having, in that order, a first portion, a second portion in communication with the return connection, and a third portion, and the wall of said passageway forming a valve seat between the second and third portions;
- first means for providing fluid flow from a point within the bore between the secondary and the return seals to the cavity second portion;
- a seal-activator in the cavity third portion, said activator having a base secured to the second end of the housing, a bellows having one end secured to the base and another end located between the base and the passageway second portion; and a member fixed to and forming a wall closing the bellows second end, said member having a flow-restricting orifice in communication with the passageway third portion and the interior of the bellows;
- second means for passing fluid in the actuator bore from a point between the primary fluid in the actuator bore from a point between the primary and secondary seals, via the interior of the bellows, to the return connection and for passing a fluid flow at a preselected rate through said means to said return connection and for impeding fluid flow in excess of the predetermined rate to expand the bellows;
- a valve member having a surface and first and second ends, said valve member being slidably mounted in the passageway first portion with its second end in the third cavity portion, said second end having a cross section larger than that of the first end, and the surface connecting said ends diverging to form a valve portion for mating with the valve seat;
- a resilient member located between the seal activator member and the second end of the valve member to bias the seal activator member and the valve member apart;
- means for latching the valve member to the seal activator member with the resilient means under stress; and
- means for releasing said resilient means in response to expansion of the bellows and for seating the valve member to close off the second means for passing fluid and to bring the operational pressure of the actuator to bear upon the secondary seal.

2. The combination claim in claim 1, wherein the bore has a wall comprising a portion of the cylinder of the hydraulic actuator and the first member is a piston.

3. The combination claimed in claim 1, wherein the bore is formed through a member closing the end of the actuator and the first member is a rod extending through the bore and attached to a piston slidably mounted within the actuator.

4. The combination claimed in claim 1, the device further comprising signaling means responsive to operation of the means for releasing said resilient means for providing an indication that excess leakage of fluid past the primary seal has occurred.

5. In combination with a hydraulic apparatus having a bore, a first member slidably mounted in the bore, and a primary, a secondary, and a return seal spaced along the bore in sliding contact with the first member, and a return connection to a reservoir of hydraulic fluid, a failure-indicating and secondary seal activating device comprising:

a housing having first and second ends, a longitudinal axis, and a walled passageway extending through the housing along the longitudinal axis and having at least a first portion in communication with the return connection and having a second portion, and the wall of said passageway forming a valve seat between said first portion and said second portion;

first means for providing fluid flow from a point within the bore between the secondary and the return seal to the passageway first portion and to the return connection;

activating means in the passageway second portion, said activating means having a movable member spaced from the second end of the housing and slidably mounted in the passageway along the longitudinal axis thereof, means for biasing said movable member toward the second end of said housing, said movable member having an end wall having therein orifice means for providing fluid flow from the passageway second portion adjacent the second end of the housing through said movable member toward the passageway first portion, said activating means having associated therewith means for preventing fluid flow from said passageway second portion past said movable member toward the passageway first portion other than through said orifice means;

second means for passing fluid in the bore from a point between the primary and secondary seals to the return connection via said orifice means and for impeding fluid flow in excess of a predetermined rate to cause said movable member to move away from said housing second end;

a valve member having a surface and first and second ends, said valve member being slidably mounted in the passageway first portion with its second end in the passageway second portion, said second end having a cross section larger than that of the first end, and the surface connecting the ends diverging to form a valve portion for mating with the valve seat;

a resilient member located between the activating means and the second end of the valve member to bias the activating means and the valve member apart;

means for latching the valve member to the activating means with the resilient means under stress; and means for releasing said resilient means in response to movement of the movable member and for seating the valve member to close off the second means for passing fluid and to bring the operational pressure of the hydraulic apparatus to bear upon the secondary seal.